(No Model.)

C. B. HOPKINS.
MONEY CHANGER.

Patented Feb. 22, 1887.

Witnesses
Chas. J. Williamson
Henry C. Hazard

Inventor
Cabel B. Hopkins
by Prindle & Russell
his attorneys (No Model.)  
C. B. HOPKINS.  
MONEY CHANGER.

No. 358,270. Patented Feb. 22, 1887.

(No Model.)

C. B. HOPKINS.
MONEY CHANGER.

Patented Feb. 22, 1887.

Fig. 3.

Witnesses:
Chas. J. Williamson
Henry C. Hazard

Inventor:
Cabel B. Hopkins
by Pindle & Russell
his Attorneys (No Model.) 7 Sheets—Sheet 4.

C. B. HOPKINS.
MONEY CHANGER.

No. 358,270. Patented Feb. 22, 1887.

Fig. 4.

Witnesses:
Chas. Williamson
Henry C. Hazard

Inventor:
Cabel B. Hopkins
by Prindle and Russel
his attorneys (No Model.)

C. B. HOPKINS.
MONEY CHANGER.

No. 358,270. Patented Feb. 22, 1887.

Witnesses
Chas. J. Williamson
Henry C. Hazard

Inventor
Cabel B. Hopkins
by Prindle & Russell
his attorneys (No Model.) 7 Sheets—Sheet 6.

C. B. HOPKINS.
MONEY CHANGER.

No. 358,270. Patented Feb. 22, 1887.

Fig 7.

Witnesses:
Chas. J. Williamson.
Henry C. Hazard.

Inventor:
Cabel B. Hopkins
by Prindle and Russell
his attorneys (No Model.)

C. B. HOPKINS.
MONEY CHANGER.

No. 358,270.   Patented Feb. 22, 1887.

Witnesses
Chas. J. Williamson
Henry C. Hazard

Inventor
Cabel B. Hopkins
by Prindle and Russell
his Attorneys

UNITED STATES PATENT OFFICE.

CABEL B. HOPKINS, OF LOUISVILLE, KENTUCKY, ASSIGNOR TO HIMSELF AND O. E. ROBINSON, OF SAME PLACE.

MONEY-CHANGER.

SPECIFICATION forming part of Letters Patent No. 358,270, dated February 22, 1887.

Application filed May 22, 1886. Serial No. 203,021. (No model.)

*To all whom it may concern:*

Be it known that I, CABEL B. HOPKINS, of Louisville, in the county of Jefferson, and in the State of Kentucky, have invented certain new and useful Improvements in Money-Changers; and I do hereby declare that the following is a full, clear, and exact description thereof, reference being had to the accompanying drawings, in which—

Letters of like name and kind refer to like parts in each of the figures.

The object of my invention is to provide an improved money-changer; and to this end my invention consists in the money-changer and the arrangement, construction, and combination of the parts thereof, as hereinafter specified.

In the drawings, A designates the casing of my apparatus, having the slotted lid A', to be locked in any desired way.

At the front of the apparatus the upper portion of the casing overhangs or projects beyond the lower portion, and through the bottom of such overhanging portion opens the discharge-mouth of the hopper B within the casing. This discharge-mouth of the hopper is normally closed by the spring-supported flap B', provided with the arm or handle $b$, which can be pressed down by the hand placed below the hopper-mouth, as fully described and set forth in my United States Patent No. 339,986.

In the lower portion of the casing is the drawer C, hung upon the swinging bars C' C' C², pivoted to the casing-bottom, as shown in the drawings. Two of these swinging bars, C' C', are pivotally attached at their outer ends to the forward side of the drawer-bottom, the one at or near its outer end and the other about the middle of the drawer. These bars alone would serve to support the drawer as it is swung in and out; but to hold it more steadily I provide the third swinging bar, C², pivotally attached to the drawer-bottom at or near one of its rear corners.

Extending across within the front portion of the casing is the bar or plate D, attached at its ends to the frame-plates D' D', fastened to the ends or sides of the casing. The forward edge of such bar or plate is over the hopper B, which, as shown, extends entirely across within the front of the casing below the bar. On the upper side of this bar are the parallel ribs $d$ $d$, arranged so as to form channels between them on top of the bar, in which slide and are guided the delivery-slides E E, adapted to move forward off the bar coins of different denominations in the well-known way.

To compensate for the different thicknesses of the various coins, some of the channels or slideways on the bar D are made deeper than others, by cutting away or making the bar thinner at such places. Over said bar are the series of coin-holders F F, for coins of various denominations, arranged so that the coins placed therein will rest directly upon bar D in the slideways between ribs $d$ $d$.

The coin-holders are, as shown, divided into halves on vertical planes, the rear halves thereof being stationary and the front halves being attached to the lid, so that when the lid is raised such forward or front halves of the holders will be raised, so that piles or rolls of coin can be put directly in place, and when the lid is down the holder-halves attached thereto will, with the stationary halves, make complete tubes, surrounding and holding the coins in upright piles. The rear halves of the holders are shown as cast together in one piece with a plate, F', extending across in front of them, and having the series of semicircular openings or notches $f$ $f$, adapted to complete the half-circles of the openings at the lower ends of the holders. With this construction the lowest or bottom coins in the piles held in the holders will, as described, rest directly on bar D in the slideways therein, so as to be free to be pushed forward by the delivery-slides, and the next to the bottom coins will be engaged on their forward sides by the forward sides of the notches or semicircular openings $ff$ in plate F', and so held while the coins below them are being delivered. Each forward movement of a delivery-slide will then, in the well-known way, push one of the pile of coins in its respective holder outward over the edge of bar D into the hopper. The forward or coin-engaging end of each of these delivery-slides is preferably forked, so as to project forward on each side of the coin, which it engages and pushes off the bar, the inner side of such fork being rounded or curved, so as to be outside of the lower edge of the holder when the slide is retracted. The fork-arms of the slides then serve to keep in place the bottom coins of the piles in the holders.

I have shown and described the rear sides of the coin-holders proper connected together and cast in one piece, but do not limit myself to such construction.

The coin-delivery slides are at their rear ends connected with the actuating horizontally-swinging levers G G, pivoted on the vertical pivot studs or pins H H on suitable brackets attached to the frame-plates D' D' on the ends or sides of the casing. Where there are, as shown in the drawings, seven of the delivery-slides, three of the actuating-levers are pivoted on one pin H and four on the other. These levers, with one exception, extend beyond the center of the apparatus, and are connected at their ends with their respective slides. This one exception is the lever which is connected with the middle slide of the series.

Figure 1:
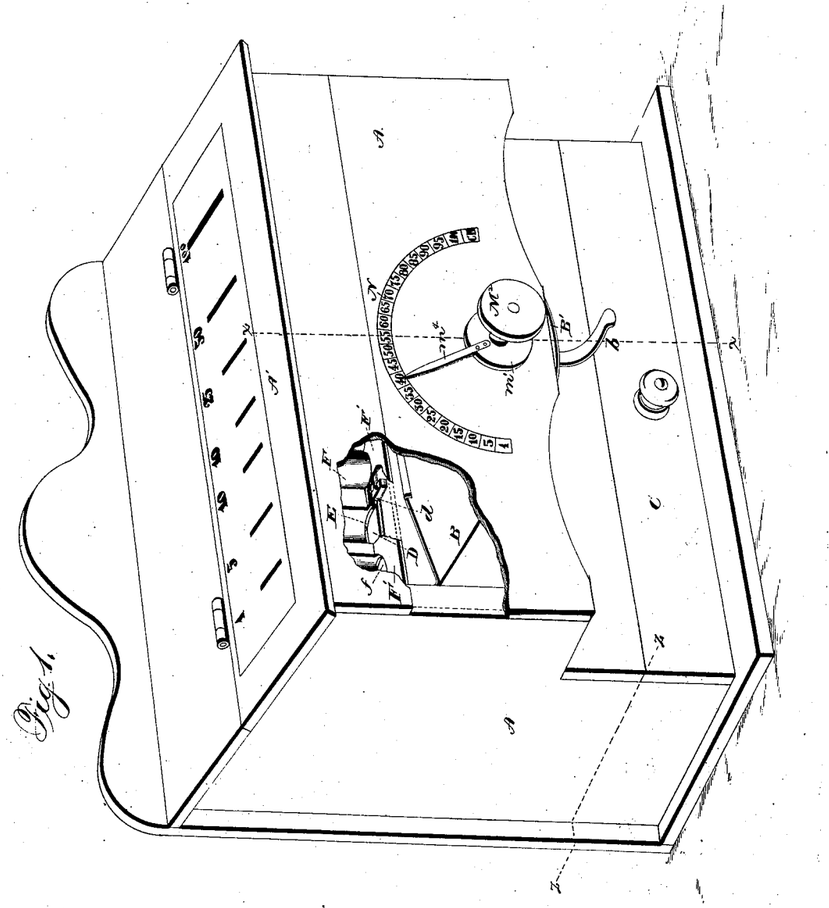
Figure 1 shows a front perspective view of my money-changer, with a portion of the casing broken away to show the mechanism within.
Figure 2:
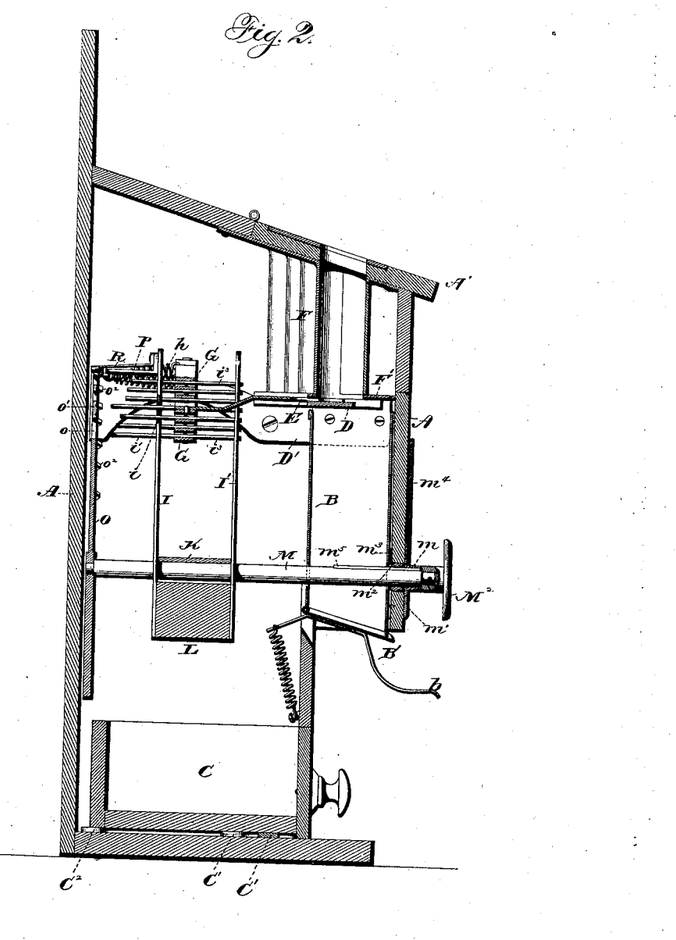
Fig. 2, a vertical section of the same on line $x$ $x$ of Fig. 1.
Figure 3:
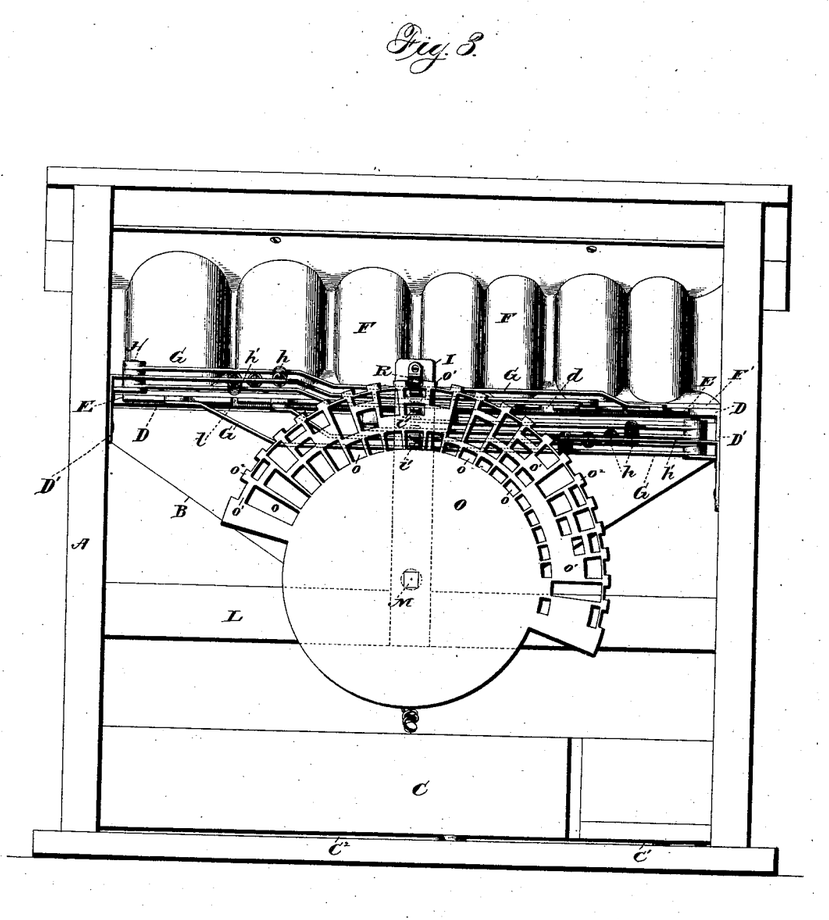
Fig. 3, a view of the apparatus in rear elevation, the back of the casing being removed.
Figure 4:
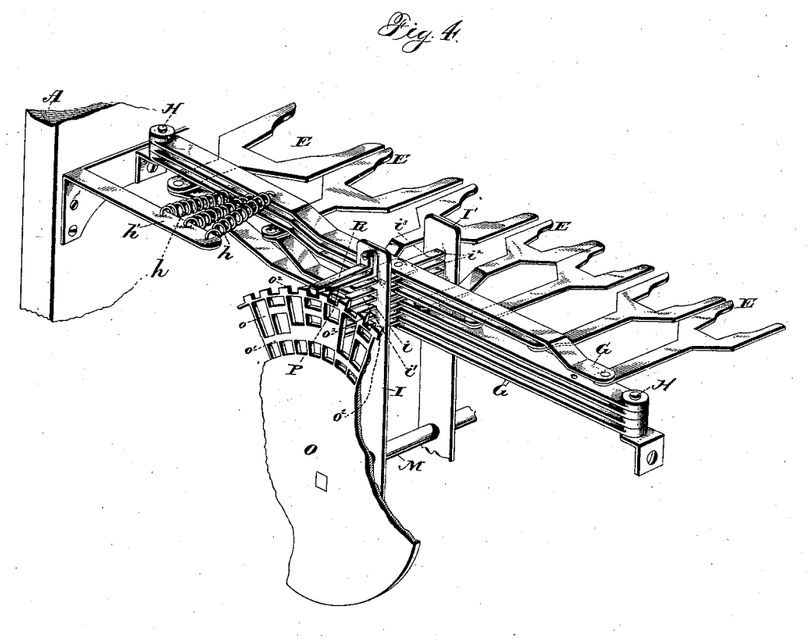
Fig. 4, a detail perspective view of the delivery-levers, the slides connected therewith, and a portion of the actuating-plate.

I prefer, as far as possible, to always carry the two series of levers inward past the middle of the series of slides and connect them with the slides on the opposite side of such central point from the pivotal ends of the levers. To retract these levers with their slides when they have been moved forward, I provide the springs $h h h$, each attached to one of the levers at its forward end and at its rear end fastened to a bar or bracket, $h'$, extending inward from one of the frame-plates D'. Just in rear of the series of levers is the standard I, having the upright series of openings $i i$, in which slide and are guided tongues or lugs $i'$ $i'$, attached to and extending rearward from the respective levers, as shown in Figs. 2, 3, and 4. In front of the series of levers and at such a distance therefrom as to allow the levers to swing sufficiently to operate the delivery slides is the second standard, I', provided, like standard I, with openings $i^2 i^2$, in which slide the tongues or lugs $i' i'$, projecting forward from the levers. With this construction the levers are guided as they swing and are held from bending up or down.

By pushing forward one of the tongues $i' i'$, projecting rearward through and beyond the standard I, the respective lever G can be actuated to cause the delivery-slide attached thereto to deliver one coin from the holder in connection with which such slide works. By pushing forward the proper tongues or lugs together any desired combination of coins can be thus delivered simultaneously from the holders down into the hopper.

With the seven levers and delivery-slides I have, in the changer shown in the drawings, provided a one-cent, a five-cent, two ten-cent, a twenty-five-cent, a fifty-cent, and a dollar coin-holder.

As the tongues or lugs $i' i'$ on the levers G G are arranged in a series near each other, it is obviously easy and convenient to press either one of them or any combination of them forward, as desired.

The standards I I' are attached to the tubular bearing K, fastened upon the bar L, extending across within the casing. In such bearing is journaled the shaft M, extending from the rear of the apparatus forward through the front of the casing. On the shaft where it passes through the casing is the sleeve $m$, having the flange $m'$ on its front end, engaging the front of the casing, and on its rear end the flange or collar $m^2$, engaging a washer, $m^3$, on the rear side of the casing front. Upon the flange $m'$ is fixed the index hand or pointer $m^4$, swinging, as the sleeve $m$ is turned, over the graduated arc N on the casing front. The shaft M is, by means of the feather or rib $m^5$, connected with the sleeve, so that the shaft can be freely moved longitudinally in the sleeve, but when it revolves the sleeve must rotate with it, carrying the hand over the graduated arc. On the rear end of the shaft is fixed the upright plate O, in the shape of a segment of a circular disk having the shaft at its center. This plate is of such radius that its outer or upper edge extends above the level of the highest one of the series of tongues or lugs $i' i'$. Around its edge are radial slots $o o$, across which extend cross-bars or solid portions $o' o'$ of the disk, so arranged as to be brought opposite the various tongues or lugs $i' i'$ by rotation of plate O.

In Fig. 3, which is a rear view, the plate is shown with its series of slots $o o$, twenty-two in number. Across the first slot at the left is the cross-bar or solid portion $o'$, adapted to come opposite the tongue or lug $i'$ on the one-cent lever when the slot is brought up opposite the series of tongues $i' i'$ by rotation of the shaft and plate. If, then, the shaft be turned to bring this first slot opposite the series of tongues or lugs, and then pulled forward by means of knob $M^2$, the bar $o'$ will engage and actuate the tongue $i'$ to work the one-cent lever and slide. The next slot has its bar $o'$ across it so situated as to similarly operate the lug on the five-cent lever. The next slot has a cross-bar adapted to strike the lug on the ten-cent lever; the next slot two bars for engaging the lugs on the five and ten cent levers together; the next slot two bars to engage the lugs on the two ten-cent levers together, to cause the slides together to deliver twenty cents; the next slot one bar to engage lug on twenty-five cent lever, and so on throughout the series, each successive slot being provided with cross-bar or cross-bars to actuate the lug or lugs on one or more levers to cause successively larger and larger amounts of change to be delivered. The last slot in the series is provided with a cross-bar or solid portion of such extent as to be capable of engaging and actuating at once the lugs on all the levers, except the one-cent and dollar ones. When the plate is turned to bring this slot around opposite the series of lever lugs or tongues $i'$ $i'$, and is pulled forward by drawing the shaft out, as described, the five, the two ten, the twenty-five, and the fifty cent levers will be actuated together to cause the simultaneous delivery of one five, two ten, one twenty-five, and one fifty cent coins to make up one dollar in change. The next to the last slot in the series is provided with the narrow cross-bar or solid portion adapted to engage the lug on the dollar-lever alone to cause a dollar coin to be delivered. If desired, the relative arrangement of these last two slots can be changed so that the single-coin dollar-slot will be last. Obviously, also, the relative positions of the other slots in the series can be changed, as desired, and the number of such slots and the corresponding holders, slides, and levers can be increased or diminished without departure from my invention.

The tongues $i'$ $i'$, extending rearward from the levers G G, are preferably made of different lengths, as shown in the drawings, to compensate for the difference in the distances of the operative ends of the levers from the points of attachment of these tongues. By this means the throw of each lever and the consequent movement of the delivery-slide carried thereby can be made to be of just the right amount. The lengths of the various tongues $i'$ $i'$ being thus properly adjusted, while the actuating-plate always moves forward through the same distance, each slide will be moved through its requisite length of motion independently of the amounts of motion of the other slides.

On the forward side of the actuating-plate O, around its upper edge, are the wedge-shaped projections or lugs $o^2$ $o^2$, one between each two slots $o$ $o$ and one at each end of the series of slots close to the outer side of the end slot. The series of lugs is outside of or above the level of the upper one of the series of tongues $i'$ $i'$. To the rear standard, I, is attached the rigid arm P, extending rearward on a level with the line of travel of the lugs $o^2$ $o^2$ as the plate O is rotated. The rear end of this arm is made wedge shaped, as shown in the drawings, Figs. 4 and 5, and the arm is of such length that when the plate is pushed back into its normal position and rotated the lugs $o^2$ $o^2$ will pass the arm end without striking it. As the plate is pulled forward to actuate the change-levers, as described, the lugs $o^2$ $o^2$ on the opposite sides of the slot $o$, brought into line with the tongues $i'$ $i'$, will pass forward on each side of the arm. If by chance the plate should not be turned so as to bring the desired slot squarely opposite the series of tongues, the arm P, engaging one or the other of the lugs $o^2$ $o^2$ on opposite sides of the slot, will cause the plate to turn a sufficient amount to bring the slot squarely into position. The arm then, with the lugs, serves to insure the proper turning of the plate O and the bringing of any desired slot squarely into proper position if the plate be first turned to bring the slot nearly into such position.

Obviously the lugs $o^2$ $o^2$ can be dispensed with, if desired, and the end of the arm be adapted to engage the upwardly extended sides of the slots. In such case the arm P might be made broader than it is shown, and the inclines on the opposite sides of its end then made longer.

The graduated arc N on the front of the casing is divided into parts equal in number to the slots $o$ $o$ in plate O, and so situated that when the shaft M and plate O are turned to bring any one of the slots $o$ $o$ opposite the series of tongues $i'$ $i'$ the pointer or index-hand $m^1$ will point to a division or space on the arc. As shown, these divisions are marked with numbers indicating the different amounts of change which can be delivered by the apparatus. Each space or division is marked with the number indicating the amount of change or the coin which will be delivered when the plate O is turned to bring the slot on the plate corresponding with such division opposite the lever lugs or tongues $i'$ $i'$ and pulled forward.

To obtain any desired amount of change, the knob or handle $M^2$ is grasped and turned to bring the pointer $m^1$ to the division marked with such amount, and is then pulled out. To overcome the tendency to turn the pointer too far where the shaft with its plate is journaled quite loosely and turns freely, and to assist in bringing the pointer quickly to the right division on the arc, I contemplate using the spring-pawl R, attached to the standard I above the arm P. This pawl consists of the main-spring portion carrying on its under side the rounded lug or projection adapted to ride up over the upper ends of the sides of the slots in the plate as such plate revolves, and to fall successively down into the spaces between such ends. Such pawl does not lock the plate, but serves to retard it and prevent its too free rotation. If desired, the upper ends of the slots can be closed above the level of arm P and the upper edge of the plate be provided with a series of notches to be engaged by the rounded lug on the pawl.

Figure 5:
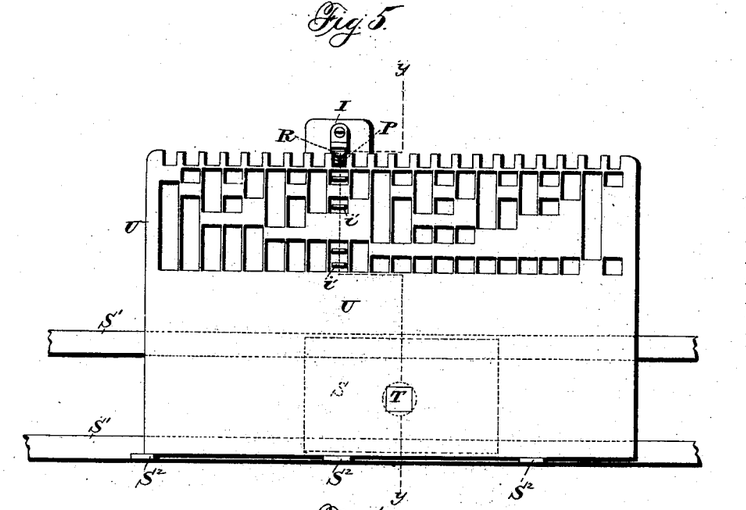
Fig. 5, a rear view in elevation of a modification of such plate, showing the arrangement of parts when such modification is used.
Figure 6:
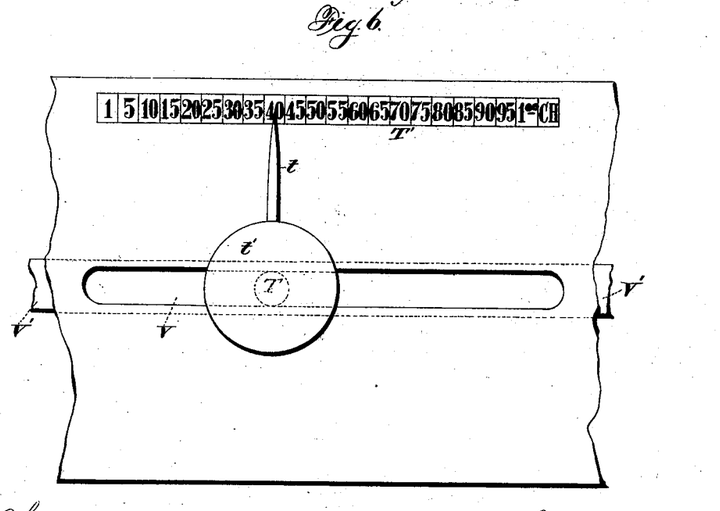
Fig. 6, a front view of the apparatus, showing the casing as when the modified actuating-plate is used.
Figure 7:
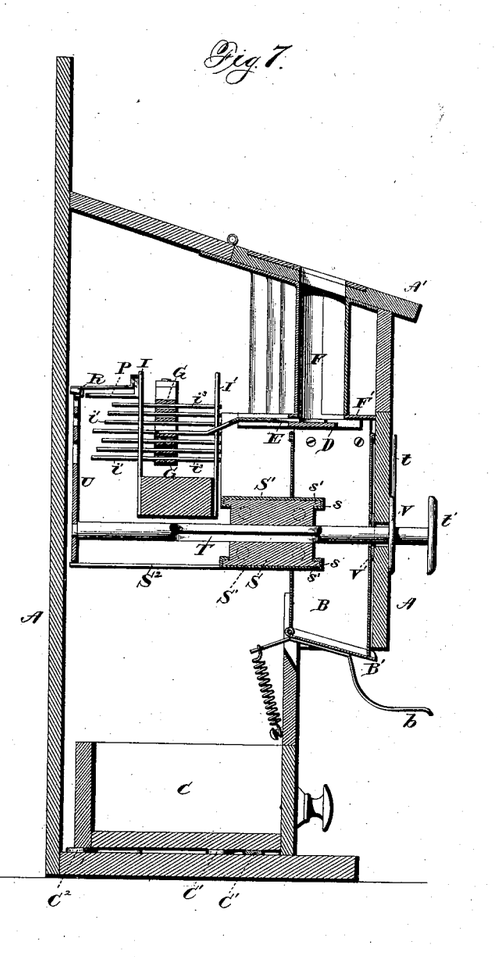
Fig. 7, a sectional view on line $y$ $y$ of Fig. 5.
Figure 8:
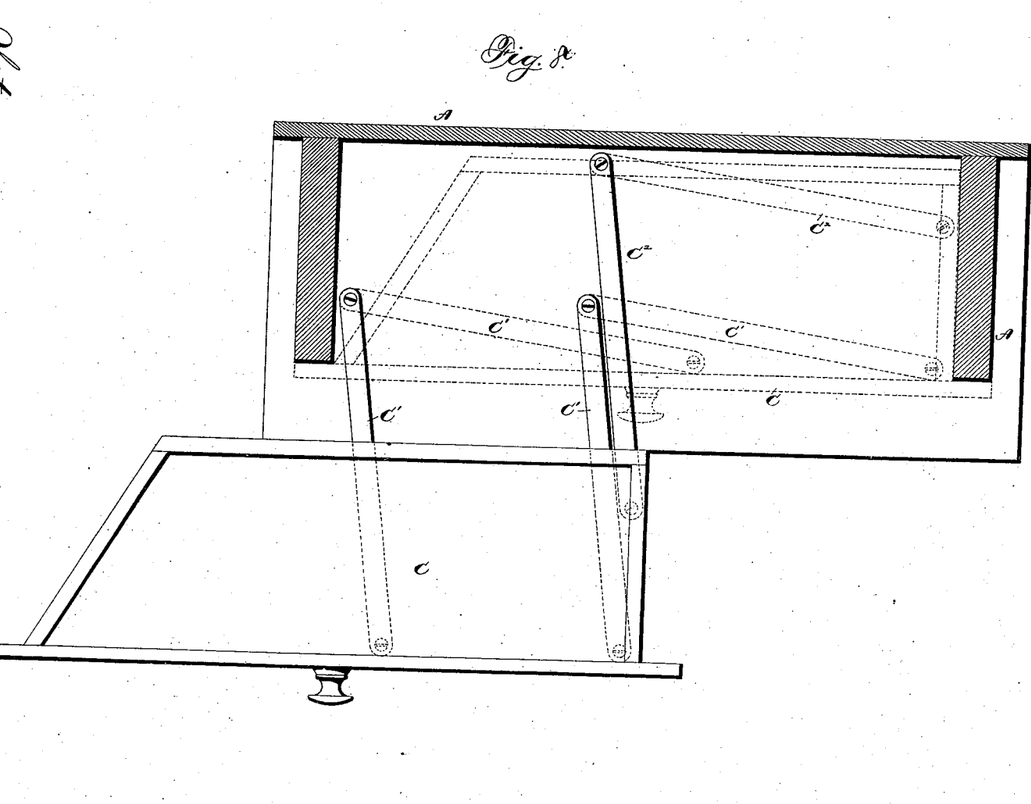
Fig. 8, a horizontal sectional view on line $z$ $z$ of Fig. 1, the drawer being out.

In Figs. 5, 6, and 7 I have shown, instead of a rotary slotted plate for actuating the delivery-levers, a reciprocating plate. In the construction shown in such figures, which is a modification of that already shown and described herein, a block, S, preferably of metal, slides in guideways S' S', extending across within the casing below the series of delivery-slides and levers. The upper one of these ways can be attached to or made in one piece with the bar D, in which are the coinways described hereinbefore, and the lower one is attached at its ends to the end frame-plates D' D'. Each of these ways has along its forward and rear edges ribs or flanges s s, turned inward, as shown, and overlapping or engaging guide-ribs s' s' on the block S. Through such block, from front to rear, passes the shaft T, to the rear end of which is fixed the plate U, of such height that its upper edge is, like that of plate O, above the top of the series of lugs or tongues $i'$ $i'$. This plate, like the rotary plate O, hereinbefore described, is provided with the series of slots and cross-bars, or rigid portions crossing the slots, so arranged as to operate different ones or different combinations of the tongues $i'$ $i'$. The upper edge of the plate is also provided with wedge-shaped lugs to engage or be engaged by the arm P, as already described, and is adapted to be engaged also by the retarding-pawl R. The front end of the shaft T extends forward through slot V in the front of the casing, where it is provided with an index arm or pointer, $t$, and knob or handle $t'$. Above the slot is a graduated scale, T', divided so that as the shaft block and plate are moved along to bring the successive slots in the plate to the series of lugs or tongues $i'$ $i'$, the pointer will point successively to the different divisions on the scale. The shaft T, where it passes through block S, can be made angular in cross-section, so that it cannot turn and will hold the plate U, extending horizontally, with its upper and lower edges in planes parallel with the line of travel of the block— that is, at right angles to the series of lugs or tongues $i'$ $i'$. I also contemplate providing one or both of the guide plates or ways S' S' with arms or lugs S², extending rearward and engaging the edge or the edges of the plate U, as indicated in the drawings.

To close the portions of the slot V on each side of the shaft, I provide the sliding plate V' on the inner side of the front of the casing.

The operation of my modified form of apparatus just described is similar to that of the other form. If change is desired, the knob M² is grasped and moved along until the index or hand points to the space on the scale T' marked with such amount. The block S and plate O are thus moved to bring the slot in such plate having the proper cross-bars or rigid portions for engaging the lugs on the levers, which will cause the delivery of the desired amount opposite the series of lugs $i'$ $i'$. A forward pull on the shaft draws it through the block S and pulls the plate forward, so as to cause the cross-bars or rigid portions of the plate to actuate the lug or lugs $i'$ $i'$ and lever or levers connected therewith, when the knob or handle M² is released, the shaft drawn rearward and inward again, and the plate O is carried back free of the lever-tongues $i'$ $i'$ by the actions of the springs retracting the lever or levers which have been pushed forward by the cross-bars or portions of the plate engaging them. With this construction in both forms of the apparatus the lever and slide retracting springs serve also to retract the lever-tongue engaging and actuating plate to its normal rearward position, where it is free to be turned.

Instead of a rotary or reciprocating plate provided with slots and cross-bars for engaging and actuating the tongues or lugs on the delivery-slide actuating devices, I contemplate also using as a substitute therefor a plate without slots and provided with pins or studs situated the same and of the same extent as the cross-bars or rigid portions on the slotted plates hereinbefore described, and shown in the drawings. The plate is then so placed in rear of the series of tongues that the pins or studs will when the plate is in its normal position not touch the tongues, and said plate will therefore be free to be moved at will past the series of tongues to bring any of the pins desired up opposite such series. When the plate is then pulled forward, the pin or pins which may be opposite the series of tongues will then engage one or more of the tongues just as do the cross-bars in the form of plate already described.

Having thus described my invention, what I claim is—

1. In a money-changer, in combination with the inclosing and supporting casing, the two horizontally-swinging bars, each pivoted to the casing at one end and at the other to the drawer at its front side, and the horizontally-swinging bar pivoted to the drawer near its rear side and to the casing in rear of the pivots of the other bars, substantially as and for the purpose described.

2. In combination with two coin-holders and devices for delivering coins therefrom, the actuating-levers connected with such devices, each provided with a tongue or lug, and a plate provided with means for engaging the two tongues or lugs, adapted to be moved toward and from the lugs, substantially as and for the purpose shown.

3. In a money-changer, in combination with the lugs or tongues on the delivery-slide-actuating devices, the plate provided with means for engaging and moving two or more of such lugs or tongues as it is moved, substantially as and for the purpose set forth.

4. In a money-changer, in combination with the series of projecting tongues or lugs on the delivery-slide actuating devices, the plate provided with a series of means for engaging different combinations of the projecting tongues and adapted to be moved so as to bring any of such series of means opposite the series of tongues and then to be moved to engage the same, substantially as and for the purpose described.

5. In a money-changer, in combination with the series of projecting lugs on the delivery-slide-actuating devices, the plate provided with a portion adapted to engage one of the tongues when it is drawn toward the series thereof, substantially as and for the purpose specified.

6. In a money-changer, in combination with the series of projecting lugs on the slide-actuating devices, the plate provided with a portion adapted to engage several of the lugs when the plate is moved toward them, substantially as and for the purpose shown.

7. In combination with the series of lugs or tongues, the plate provided with a series of means for engaging different lugs and combinations of the lugs as it is moved toward the lugs and so arranged that any of such means can be brought opposite the series of lugs by motion of the plate past the lugs, substantially as and for the purpose set forth.

8. In combination with the series of lugs or tongues and the plate adapted to be moved past them and also toward them, the series of means on the plate adapted to engage and actuate different lugs and different combinations thereof when the plate is moved toward them, substantially as and for the purpose described.

9. In combination with the series of tongues or lugs, the plate adapted to be moved past and also toward such series, provided with a series of slots adapted to be brought opposite the lugs by motion of the plate past the latter and with rigid portions or bars crossing such slots, so arranged as to engage different tongues or different combinations thereof when the plate is moved toward the series of tongues, substantially as and for the purpose specified.

10. In combination with the series of tongues, the plate provided with a slot and with a bar or rigid portion crossing such slot, adapted to engage one of said tongues as the plate is moved toward the series thereof, substantially as and for the purpose shown.

11. In combination with the series of tongues, the plate adapted to be moved toward the same, provided with a slot and with a bar or rigid portion across such slot adapted to engage two of the tongues when the plate is moved toward the series thereof, substantially as and for the purpose set forth.

12. In combination with the series of tongues, the plate adapted to be moved toward the same, provided with a slot and with several bars or rigid portions across such slot adapted to engage with several of the tongues when the plate is moved toward the series thereof, substantially as and for the purpose shown.

13. In combination with the series of tongues, the plate adapted to be moved toward such series and also in a plane at right angles to such motion and provided with a series of means for engaging and operating different ones and different combinations of the tongues, such series being arranged on the plate in the line of its motion past the series of tongues, substantially as and for the purpose set forth.

14. In combination with the series of tongues, the plate adapted to be moved toward such series and also in a plane at right angles to such motion and provided with means for engaging different ones of said tongues, adapted to be brought opposite the series of tongues successively as the plate is moved past the latter, substantially as and for the purpose described.

15. In combination with the series of tongues to be actuated, the plate adapted to be moved in two directions, one toward the series of tongues and the other past the tongues at right angles to the former direction, and provided with means for engaging different combinations of said tongues adapted to be brought opposite the series of tongues by the movement of the plate past them, substantially as and for the purpose specified.

16. In combination with the series of tongues to be actuated, the plate adapted to be moved toward and also past such series in a plane at right angles thereto and provided with a slot at right angles to the line of motion of the plate past the series of tongues and with a bar or rigid portion crossing said slot adapted to engage one of the tongues, substantially as and for the purpose shown.

17. In combination with the series of tongues, the plate adapted to be moved toward and also past the same at right angles thereto, provided with two or more slots at right angles to the line of travel of the plate past the tongues, and with bars or rigid portions extending across such slots adapted to engage different tongues in the series, substantially as and for the purpose set forth.

18. In combination with the series of tongues, the plate adapted to be moved toward and also past the series of tongues at right angles thereto, provided with two or more slots at right angles to the line of its motion past the series of tongues and with bars or rigid portions extending across such slots, each adapted to engage several of the tongues at a time when the plate is moved toward the series, substantially as and for the purpose described.

19. In a money-changer, in combination with a suitable casing and the series of tongues or lugs connected with the devices for operating the delivery-slides, the plate provided with a series of means for engaging the tongues, a shaft attached to the plate and extending out through the casing and provided with a suitable handle, and an index to indicate the position of the plate, substantially as and for the purpose specified.

20. In combination with the series of tongues connected with the coin-delivering devices, the plate O, provided with series of means, substantially as described, for engaging the tongues, the shaft connected with the plate for moving the same past and toward the series of tongues, and an indicator and marked scale for indicating which one of the series of tongue-engaging means on the plate is opposite the series of tongues, substantially as and for the purpose shown.

21. In combination with the series of tongues and the plate adapted to be moved past and toward the same, provided with a series of means, substantially as described, for engaging different tongues and combinations of tongues, the shaft rigidly connected with the plate, so as to move the same past as well as toward the series of tongues, an index or pointer on the shaft, and the marked scale, substantially as and for the purpose set forth.

22. In combination with the series of tongues, the rotary reciprocating plate provided with a series of means adapted to engage different ones and different combinations of the tongues, and so situated as to be brought successively opposite the series of tongues by rotation of the plate, and the reciprocating and rotary shaft carrying such plate, substantially as and for the purpose described.

23. In combination with the series of tongues and the reciprocating rotary plate provided with the series of tongue-engaging means adapted to be moved past the tongues by rotation of the plate, the rotary and reciprocating shaft carrying the plate and an index and scale for indicating the rotary movements of the plate, substantially as and for the purpose specified.

24. In combination with the rotary and reciprocating shaft and the bearing therefor, the rotary flange or plate through which the shaft passes, connected with the shaft by means of a feather, the index-hand on this plate, and the marked scale over which such hand travels as the plate rotates with the shaft, substantially as and for the purpose shown.

25. In combination with the casing and the rotary and reciprocating shaft within and passing out through the same, the plate provided with a hub journaled in the casing and surrounding the shaft and connected by a feather with the shaft, and the pointer on the plate adapted to indicate on a scale on the casing, substantially as and for the purpose set forth.

26. In a money-changer, in combination with the series of delivery-slide-actuating devices arranged one above the other and each provided with a rearwardly-extending lug or tongue, the standard provided with separate slots in which such tongues are held and guided, substantially as and for the purpose described.

27. In a money-changer, in combination with the series of delivery-slide-actuating devices, the tongues attached to such devices and situated substantially in line with each other, and the bar or standard provided with separate slots for steadying and guiding such tongues, substantially as and for the purpose shown.

28. In a money-changer, in combination with the series of levers for actuating the delivery devices, the tongues pivoted to and extending from them, and a standard provided with a series of slots receiving and guiding such tongues separately, substantially as and for the purpose set forth.

29. In a money-changer, in combination with the series of levers for actuating the delivery devices and the tongues on such levers projecting in front and rear thereof, the two slotted guide-standards, one in front and the other in the rear of the series of levers, substantially as and for the purpose specified.

30. In a money-changer, in combination with the series of levers for actuating the delivery devices, the plates pivotally connected with the levers and having tongues projecting in front and rear of the levers, and the two standards, one in front and the other in rear of the levers, provided with slots receiving and guiding said tongues separately, substantially as and for the purpose described.

31. In a money-changer, in combination with series of delivery devices and the actuating-levers connected therewith, the series of projecting tongues, one on each lever, the lengths of the tongues being proportionate to the distance of the tongues from the points of connection of the delivery devices with the respective levers, substantially as and for the purpose shown.

32. In combination with the series of tongues, the plate adapted to be moved past and toward such series, provided with the series of devices for engaging different ones of the tongues as the plate is moved toward them, and with a series of lugs between the devices of such series, and the arm provided with the beveled or wedge-shaped end arranged in line with the series of tongues, substantially as and for the purpose specified.

33. In combination with the series of tongues and the rigid arm in line with the same, the plate provided with the series of means for engaging and actuating the tongues, adapted to be brought opposite the series of tongues by movement of the plate, and the series of wedge-shaped lugs or projections on the plate between the different tongue-actuating devices on the plate, substantially as and for the purpose set forth.

34. In combination with the series of tongues, the plate provided with the series of slots and with bars or rigid portions across such slots, the wedge-shaped lugs arranged on the plate in line with the spaces between the slots, and the arm in line with the series of tongues, substantially as and for the purpose described.

35. In combination with the series of tongues, the plate provided with the series of different tongue-engaging devices adapted to be brought opposite the tongues successively by movement of the plate, and with notches in its edge, and the spring-pawl engaging such notches, substantially as and for the purpose specified.

In testimony that I claim the foregoing I have hereunto set my hand this 20th day of March, A. D. 1886.

C. B. HOPKINS.

Witnesses:
HENRY C. HAZARD,
FRANK M. GREEN.